US006256862B1

(12) United States Patent
Olden et al.

(10) Patent No.: US 6,256,862 B1
(45) Date of Patent: Jul. 10, 2001

(54) COIL ADVANCE DRIVE FOR AN APPARATUS APPLYING PLATE COILS TO WOODEN FRAMES

(75) Inventors: Michael Marc Olden, Pacific; Kathy Liuhui Jin, Chesterfield, both of MO (US)

(73) Assignee: MiTek Holdings, Inc., Wilmington, DE (US)

( * ) Notice: Subject to any disclaimer, the term of this patent is extended or adjusted under 35 U.S.C. 154(b) by 0 days.

(21) Appl. No.: 09/347,326

(22) Filed: Jul. 2, 1999

(51) Int. Cl.[7] .............................. B23P 23/00; B23Q 7/00; B65H 23/00

(52) U.S. Cl. .......................... 29/564.6; 29/33 K; 29/795; 226/76

(58) Field of Search .................................... 29/33 Q, 604, 29/564.6, 740, 795, 33 S, 33 K, 827; 226/139, 128, 49, 30, 76; 72/426

(56) References Cited

U.S. PATENT DOCUMENTS

| | | | | |
|---|---|---|---|---|
| 3,577,851 | * | 5/1971 | Detheridge | 29/596 |
| 3,580,018 | * | 5/1971 | Gott | 72/148 |
| 3,806,014 | * | 4/1974 | Bulli | 226/30 |
| 3,895,708 | | 7/1975 | Jureit et al. . | |
| 3,910,089 | * | 10/1975 | Meier | 72/146 |
| 3,913,816 | | 10/1975 | Jureit et al. . | |
| 3,970,386 | * | 7/1976 | Wohlrab | 226/49 X |
| 4,670,976 | * | 6/1987 | Stridsberg et al. | 29/740 |
| 4,887,452 | * | 12/1989 | Bakermans | 72/420 |
| 5,019,209 | * | 5/1991 | Hiraide et al. | 29/827 X |
| 5,725,140 | * | 3/1998 | Weber et al. | 226/139 |

FOREIGN PATENT DOCUMENTS

2033789 * 10/1981 (GB) .

* cited by examiner

*Primary Examiner*—William Briggs
(74) *Attorney, Agent, or Firm*—Senniger, Powers, Leavitt & Roedel

(57) ABSTRACT

A coil advance drive apparatus for connector plate coils is described. The coil advance drive apparatus includes a support structure, a motor coupled to the support structure, at least one elongate coil support member coupled to the support structure, and at least one drive wheel operatively coupled to the motor Each drive wheel is configured to engage the connector plate coil stock. The coil support member includes a plurality of grooves extending longitudinally in one surface of the support member The grooves are configured to receive the pre-punched teeth extending from the connector plate coil stock. The drive wheel includes a plurality of teeth extending from a circumferential surface of the drive wheel. The teeth are configured to engage the open slots in the connector plate coil stock so as to move the coil stock along the support member as the drive wheel rotates. An elongate coil guide cover is coupled to the surface of each coil support member above the grooves. The coil guide cover is configured to at least partially cover the surface of the coil support member to form a channel. The channel is configured to permit the connector plate stock to move along the surface of the support member with the teeth located in the grooves and the coil stock prevented from bending up off the coil support by the coil support cover.

26 Claims, 6 Drawing Sheets

COIL ADVANCE DRIVE FOR AN APPARATUS APPLYING PLATE COILS TO WOODEN FRAMES

BACKGROUND OF THE INVENTION

This invention relates generally to apparatus for forming wooden frames and the like, and more particularly, to providing discrete connector plates from a coil of connector plate stock.

Connector plates having integrally formed nail-like teeth depending from a surface are used to fabricate various wooden frames, crates, trusses, and the like. Connector plates are used because of the ease and speed of fabrication which translates to lower costs. Typically, wooden members are placed on a jig table, and positioned in the form of the desired frame. Then, connector plates are positioned on opposite sides of the frame joints. The teeth of the connector plates are then embedded into the wooden members, usually, with a press.

To improve efficiency, at least some known presses include feed systems that index a desired length of connector plate coil stock into the press machine. The machine cuts a connector plate from the coil, positions the plate over the frame joint, and then presses the connector plate to embed the teeth of the connector plate into the wooden members. An example of such a press is described in U.S. Pat. No. 3,913,816.

The press described in Pat. No. 3,913,816 includes a coil feed assembly that advances two coils into the press. The coils are typically fabricated from an elongate strip of sheet metal connector plate coil stock having a plurality of spaced open slots formed by pre-punched, integrally formed elongate nail-like teeth extending from one surface of the connector plate stock. The first coil supplies connector plates for the top side of the frame joint and the second coil supplies connector plates for the bottom side of the frame joint. The connector plate coil stock is advanced into the press by a slide block coupled to an air cylinder. Additional air cylinders move clamps into engagement with the coils of connector plate coil stock to hold the coil stock to the slide block as the slide block advances the coil stock into the press. The clamps are released by retracting the air cylinders and then the slide block is moved back to its original position by retracting the air cylinder. The process is then repeated for the next pair of connector plates. This press relies on the action of air cylinders to move the coil stock into the press. As air cylinders wear they become less reliable and sometimes stick in one position. A buildup of dirt on the cylinder rod may prevent the rod from moving smoothly through the cylinder seals and may cause the cylinder rod to stick or move slowly. The 3,913,816 press includes air cylinders for advancing the first coil, and air cylinders for advancing the second coil. If any one cylinder moves slower than the others or sticks, the press could malfunction and jam.

It would be desirable to provide a connector plate coil advance drive that is reliable to smoothly advance connector plate coil stock into a press without the use of hydraulic or air cylinders.

SUMMARY OF THE INVENTION

These and other objects may be attained by a coil advance drive apparatus for connector plate coils. The coil advance drive apparatus includes a frame, a motor coupled to the frame, at least one elongate coil support member coupled to the frame, and at least one drive wheel operatively coupled to the motor. Each drive wheel is configured to engage the connector plate coil stock.

Particularly, the coil support member includes a plurality of grooves extending longitudinally in one surface of the support member. The grooves are configured to receive the pre-punched teeth extending from the connector plate coil stock. The drive wheel includes a plurality of teeth extending from a circumferential surface of the drive wheel. The teeth are configured to engage the open slots in the connector plate coil stock so as to move the coil stock along the support member as the drive wheel rotates. An elongate coil guide cover is coupled to the surface of each coil support member above the grooves. The coil guide cover is configured to at least partially cover the surface of the coil support member to form a channel. The channel is configured to permit the connector plate stock to move along the surface of the support member with the teeth located in the grooves and the coil stock prevented from bending up off the coil support by the coil support cover.

The apparatus also includes at least one coil mounting arm coupled to the frame of the apparatus. Each coil mounting arm includes an elongate portion mounted at one end to the frame and includes a coil mounting hub located at the other end of the elongate portion. The coil mounting hub is configured to rotatably mount a coil of connector plate stock.

A magnetic proximity switch is operatively coupled to at least one drive wheel to count the revolutions of the drive wheel. This information permits indexing and cutting the proper length of connector plate stock from the coil to form the desired length connector plate.

In operation, the coil advance drive apparatus is typically attached to a shear for cutting the connector plates to length or a combination shear/press that cuts the connector plate from the coil stock and presses the connector plate into wooden members of a frame to join the members together in one operation. A coil of connector plate stock is mounted on a coil mounting arm of the drive apparatus. Specifically, the coil is mounted on the coil mounting hub of the mounting arm. The coil stock is them fed into the drive apparatus so that the coil stock slides through the coil support member with the nail-like teeth of the coil stock located in the grooves of the support member. The drive wheel engages the coil stock with the teeth extending from the drive wheel engaging the open slots of the coil stock. As the drive wheel rotates, the coil stock is advanced by the action of the rotating teeth engaging the coil stock in the slots of the coil stock. The coil stock is advanced through the channel formed by the support member and the coil support cover.

The proximity switch counts the revolutions of the drive wheel so that the drive wheel can be stopped when the desired length of connector plate coil stock is advanced into the shear to be cut. After the shear has cut a connector plate from the coil, the drive motor can be re-energized to advance another length of connector plate coil stock into the shear for cutting.

The above described coil advance drive apparatus smoothly advances connector plate coil stock into a press The drive wheel that advances the coil stock through the apparatus is reliable and does not have the inherent problems of hydraulic or air cylinders, such as sticking in one position or slow movement of the cylinder rod due to dirt buildup.

DETAILED DESCRIPTION OF THE INVENTION

Figure 1:
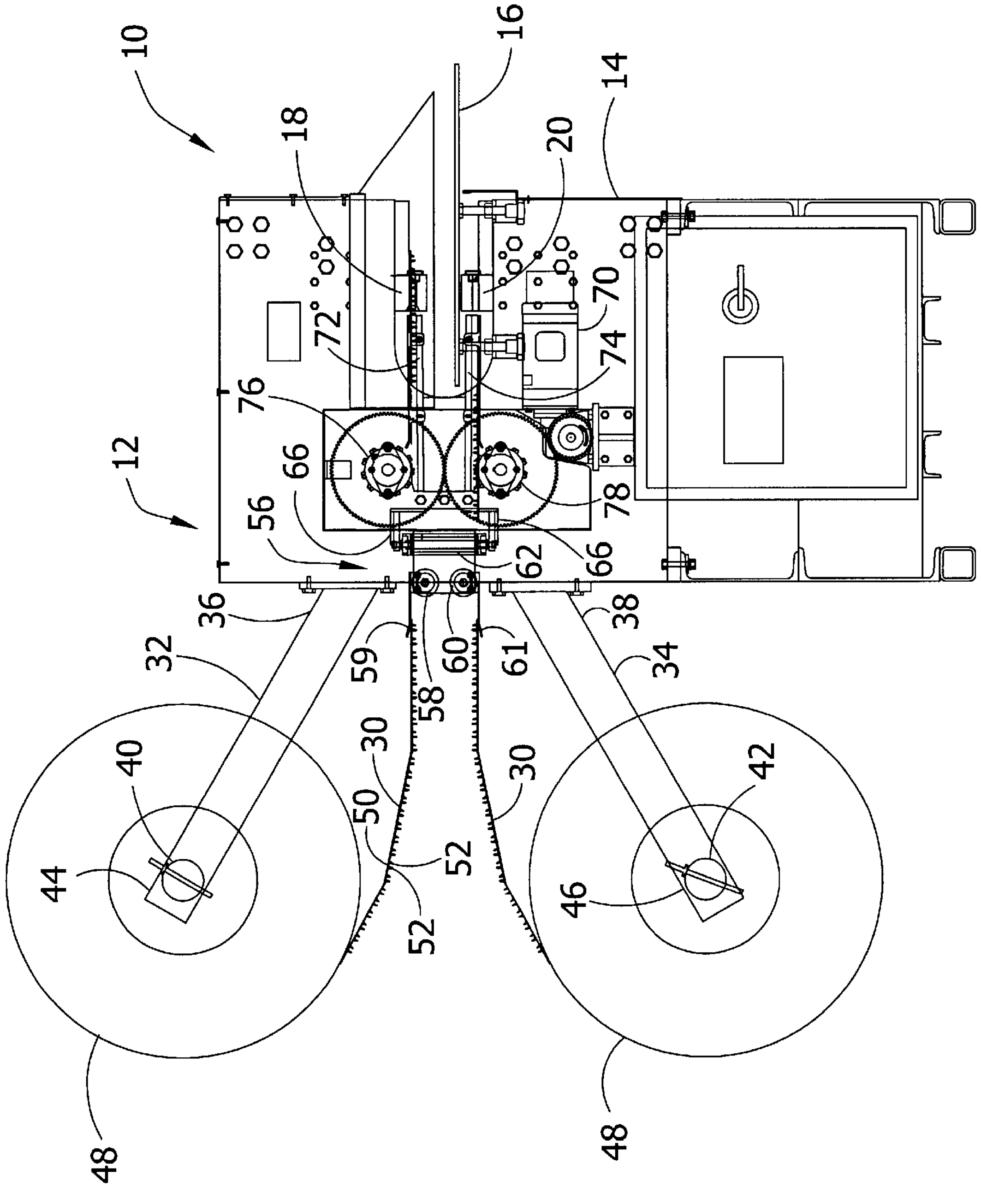
FIG. 1 is a schematic illustration in side view of a press that includes a coil advance drive apparatus in accordance with an embodiment of the present invention.

FIG. 1 is a schematic illustration in side view of a press 10 that includes a coil advance drive apparatus 12 in accordance with an embodiment of the present invention. Press 10 includes a support structure 14 and a work surface 16 coupled to support structure 14. An upper combination shear/press 18 and a lower combination shear/press 20 are coupled to support structure 14 and are located above and below work surface 16 respectively. Adjacent upper and lower presses 18 and 20 are upper and lower jaw supports 22 and 24 (FIG. 3) respectively. Jaws 26 and 28 are coupled to jaw supports 22 and 24 respectively. Jaws 26 and 28 are configured to hold connector plate coil stock 30 in place as combination shear/presses 18 and 20 cut connector plate coil stock 30.

Drive apparatus 12 includes coil mounting arms 32 and 34 coupled at first ends 36 and 38 respectively to support structure 14. Coil mounting arms 32 and 34 include coil mounting hubs 40 and 42 located at second ends 44 and 46 respectively. Coil mounting hubs 40 and 42 each are configured to rotatably mount a coil 48 of connector plate coil stock 30.

Coil 48 is typically fabricated from an elongate strip of sheet metal connector plate stock 30 having a plurality of spaced open slots 50 formed by pre-punched, integrally formed elongate nail-like teeth 52 extending from a first surface 54 of connector plate stock 30.

Figure 2:
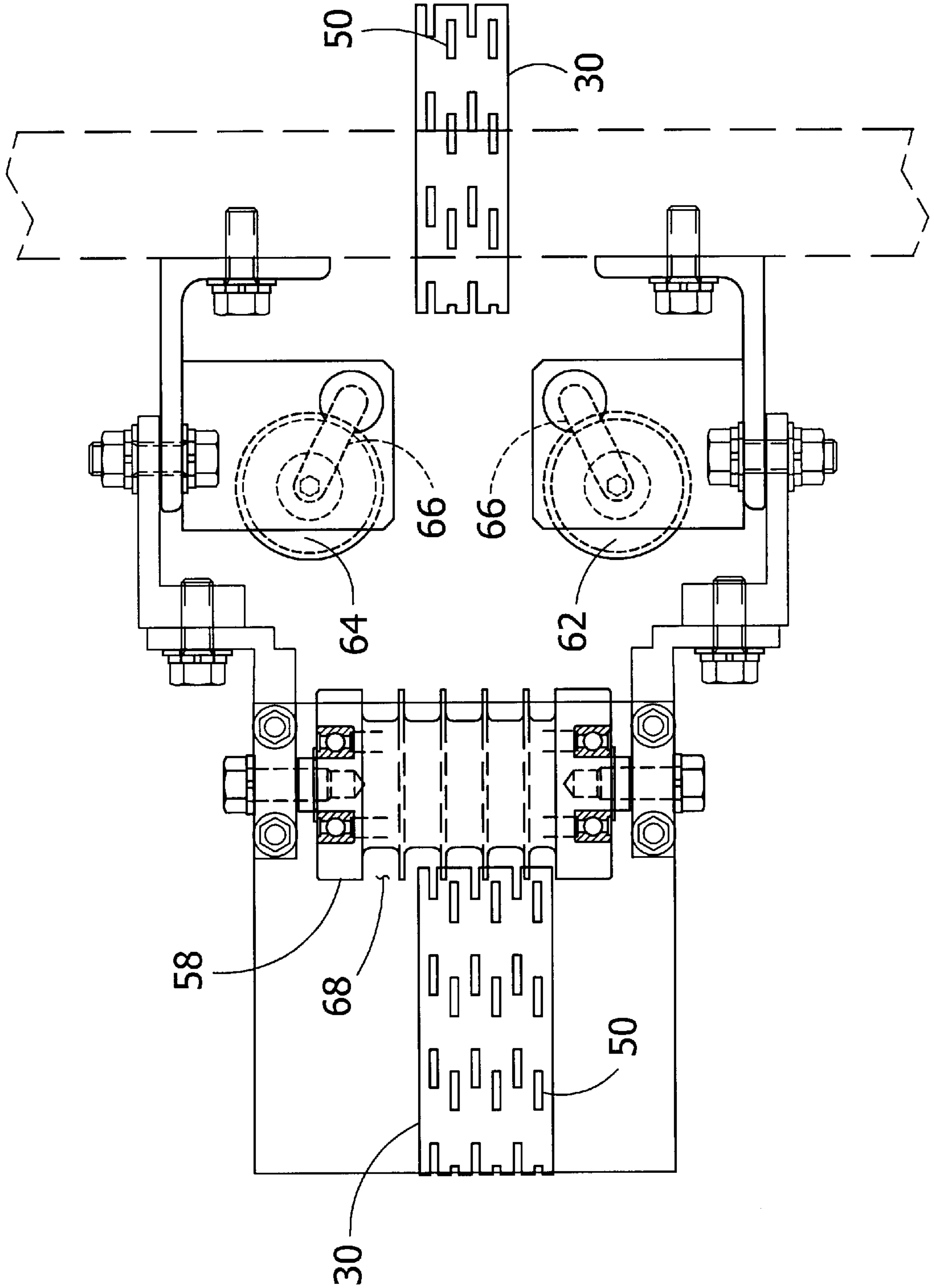
FIG. 2 is an enlarged top view of the guide assembly of the coil advance drive apparatus shown in FIG. 1.

Drive apparatus 12 also includes a guide assembly 56 to maintain the proper tension on coil 48 as coil stock 30 moves through drive apparatus 12. Guide assembly 56 includes an upper guide roller 58, a lower guide roller 60 and upper and lower guide members 59 and 61. Guide assembly 56 also includes side alignment rollers 62 and 64 (shown in FIG. 2) to maintain coil stock 30 in proper alignment as coil stock 30 enters drive apparatus 12. Side alignment roller 62 and 64 are coupled to pivot arms 66 which permits alignment rollers 62 and 64 to pivot to accommodate coil stock 30 having different widths. Referring to FIG. 2, upper and lower guide rollers 58 and 60 each include a plurality of circumferential grooves 68 that are configured to align with and receive nail-like teeth 52 of coil stock 30. Grooves 68 permit coil stock 30 can pass over guide roller 56 and 58 without bending teeth 52.

Referring again to FIG. 1, coil advance drive apparatus 12 further includes a motor 70 coupled to support structure 14, upper and lower elongate coil support members 72 and 74 coupled to support structure 14, and upper and lower drive wheels 76 and 78 operatively coupled to motor 70. Drive wheels 76 and 78 are configured to engage connector plate coil stock 30.

Figure 3:
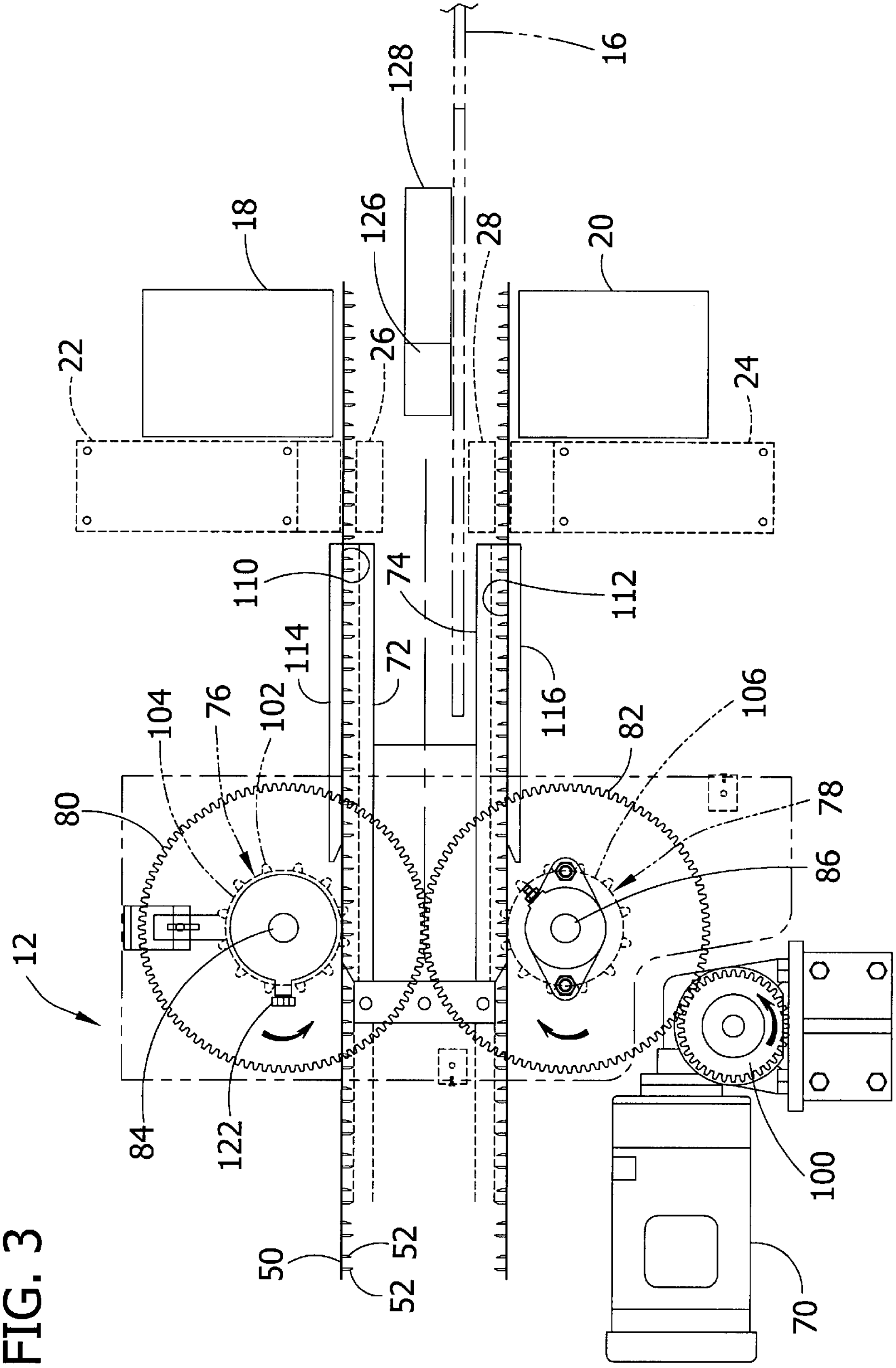
FIG. 3 is an enlarged view of a portion of the coil advance drive shown in FIG. 1.
Figure 4:
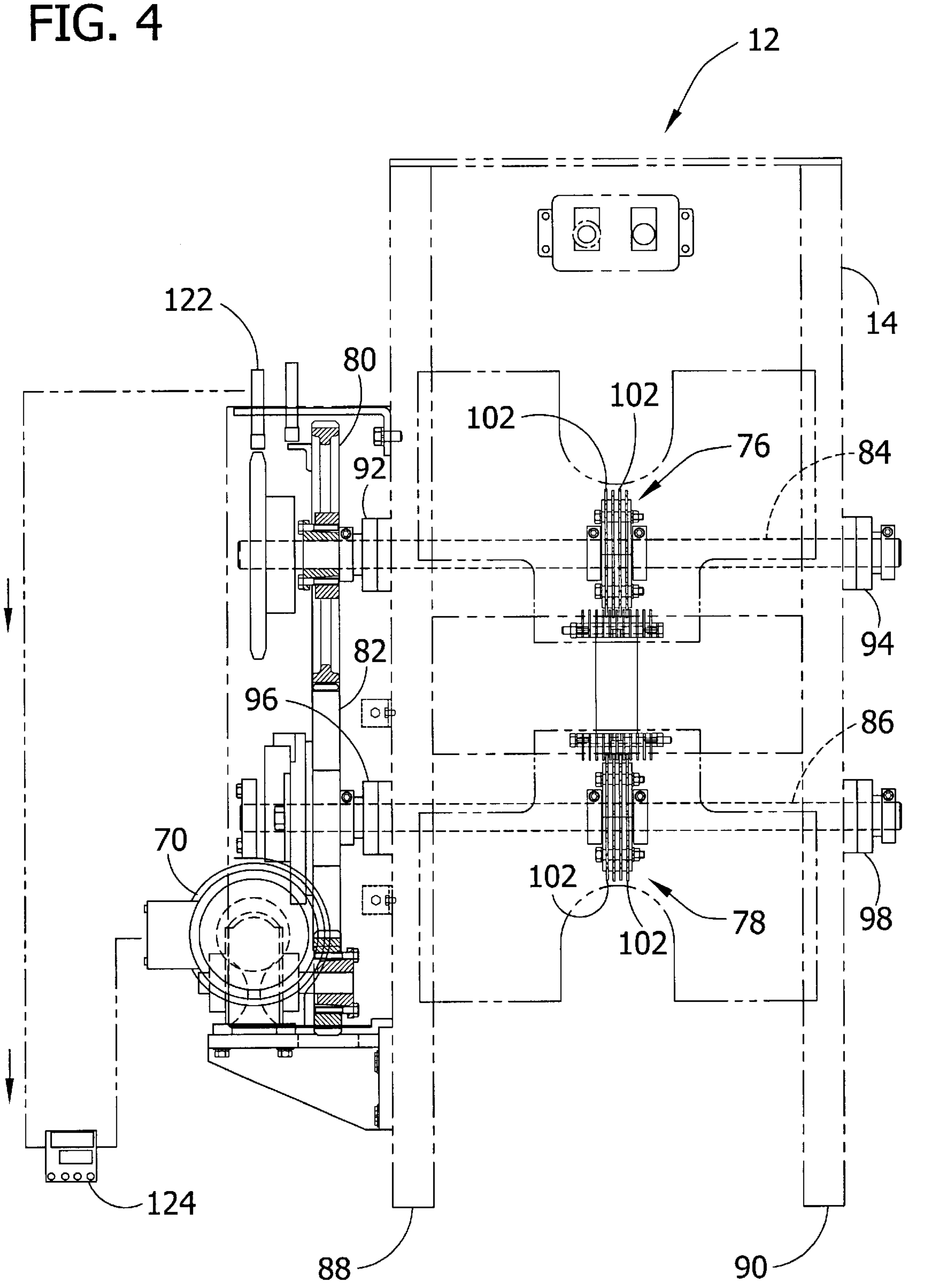
FIG. 4 is a back view of the coil advance drive shown in FIG. 2.

FIG. 3 is an enlarged view of a portion of the coil advance drive 12 shown in FIG. 1, and FIG. 4 is a back view of the coil advance drive 12 shown in FIG. 3. Referring to FIGS. 3 and 4, wheel gears 80 and 82 are coupled to drive wheels 76 and 78 respectively Particularly, drive shafts 84 and 86 extend through a first and a second side 88 and 90 of support structure 14. Bearing journals 92 and 94 couple drive shaft 84 to support structure 14, and bearing journals 96 and 98 couple drive shaft 86 to structure 14. Drive wheels 76 and 78 are coupled to drive shafts 84 and 86 respectively. Drive wheels 76 and 78 are positioned on drive shafts 84 and 86 so as to be located between first and second sides 88 and 90 of support structure 14. Wheel gears 80 and 82 are coupled to drive shafts 84 and 86 respectively. Wheel gear 82 is configured to engage wheel gear 80 so that as gear 82 rotates in a given direction, for example clockwise, gear 80 rotates in the opposite direction, counterclockwise. Wheel gears 80 and 82 typically are configured so that drive wheels 76 and 78 rotate at the same speed measured in revolutions per minute, however other configurations may be used.

A drive gear 100 is operatively coupled to motor 70. Drive gear 100 is configured to engage wheel gear 82 so as to rotate wheel gear 82 when motor 70 is energized. A plurality of teeth 102 extend from circumferential surfaces 104 and 106 of drive wheels 76 and 78 respectively. Teeth 102 are configured to engage open slots 50 in connector plate coil stock 30 so as to move coil stock 30 along support members 72 and 74 as drive wheels 76 and 78 rotate. When drive wheels 76 and 78 rotate at the same speed, identical lengths of coil stock 30 will be advanced into shear/presses 18 and 20.

A plurality of grooves 108 (shown in FIG. 7) extend longitudinally in a first surface 110 and 112 of coil support members 72 and 74 respectively. Grooves 108 are configured to receive pre-punched teeth 52 extending from connector plate coil stock 30. Elongate coil guide covers 114 and 116 are coupled to surfaces 110 and 112 of coil support members 72 and 74. Coil guide covers 114 and 116 are configured to at least partially cover surfaces 110 and 112 respectively of coil support members 72 and 74 to form channels 118 and 120. Channels 118 and 120 are configured to permit connector plate stock 30 to move along surfaces 110 and 112 of support members 72 and 74 with teeth 52 located in grooves 108 . Coil stock 30 is prevented from bending up off coil supports 72 and 74 by coil support covers 114 and 116 respectively, Coil guide covers 114 and 116 may be fabricated from any suitable material, for example, plastic, steel, aluminum, and the like.

An electrical count/measure member 122, for example a magnetic proximity switch, is operatively coupled to drive wheel gear 80 to measure the revolutions of drive wheel 76. An electrical control member 124, for example a PLC controller, is wired to proximity switch 122 and motor 70. Control member 124 cycles motor 70 on and off to permit advancing the proper length of connector plate stock 30 from coil 48 into shear/presses 18 and 20 to form the desired length connector plate and press the connector plate into frame members 126 and 128.

Figure 6:
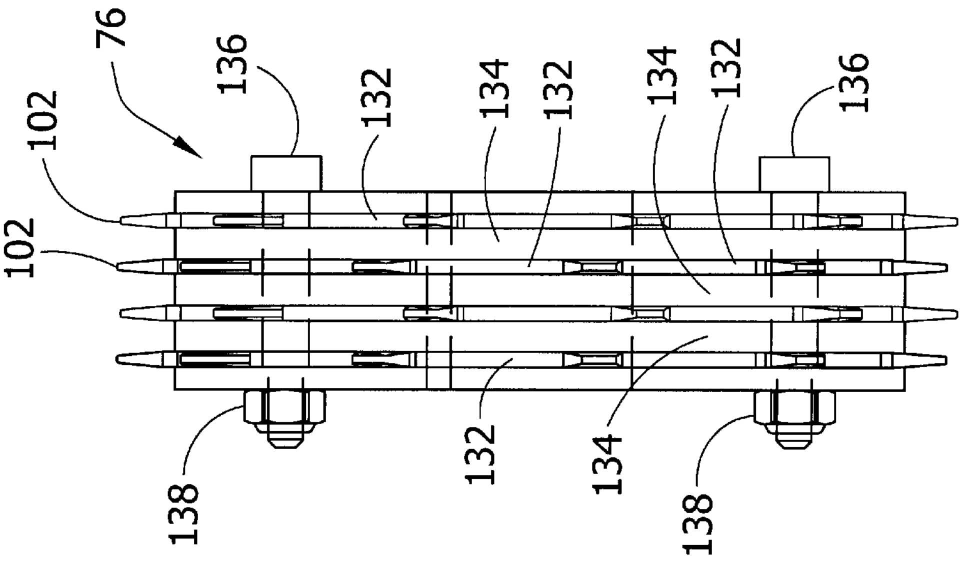
FIG. 6 is a front view of the drive wheel shown in FIG. 5.
Figure 5:
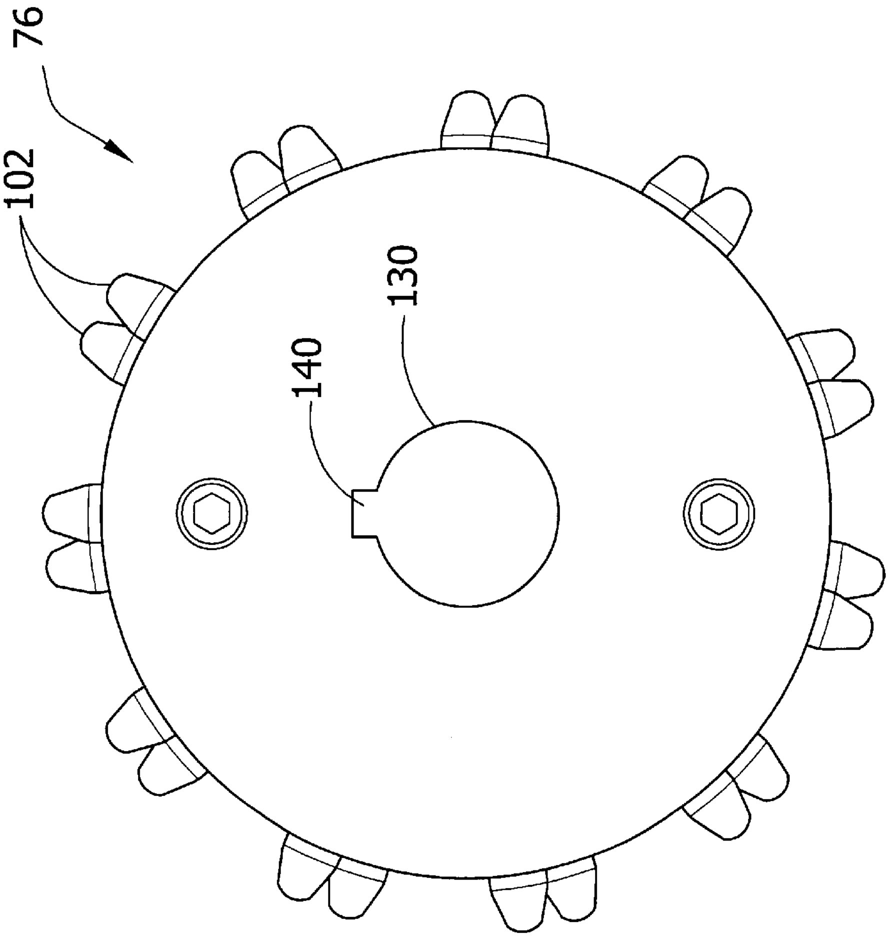
FIG. 5 is side view of a drive wheel of the coil advance drive shown in FIG. 3

FIG. 5 is side view of drive wheel 76 and FIG. 6 is a front view of drive wheel 76. Referring to FIGS. 5 and 6, drive wheel 76 includes a central bore 130 configured to receive drive shaft 84 (shown in FIG. 4). Drive wheel 78 is identical to drive wheel 76, and therefore the following description of drive wheel 76 also applies to drive wheel 78. Drive wheel 76 includes a plurality of drive sprockets 132 and a plurality of spacers 134. Each drive sprocket 132 is separated from an adjacent drive sprocket 132 by at least one spacer 134. Drive sprockets 132 and spacers 134 are coupled together to form drive wheel 76. Particularly, bolts 136 extend through drive sprockets 132 and spacers 134, and nuts 138 secure sprockets 132 and spacers 134 together to form drive wheel 76. Central bore 130 includes a keyway 140 for aligning drive sprockets 132. Teeth 102 extend from each drive sprocket 132. As described above, teeth 102 are configured to engage open slots 50 in connector plate coil stock 30 so as to move coil stock 30 along support member 72 as drive wheel 76 rotates. In one embodiment, teeth 102 are tapered to permit operation when slots 50 and teeth 102 are mis-aligned. In alternate embodiments, drive wheels 76 and 78 may each be one piece with teeth 102 machined into circumferential surfaces 104 and 106 respectively.

Figure 7:
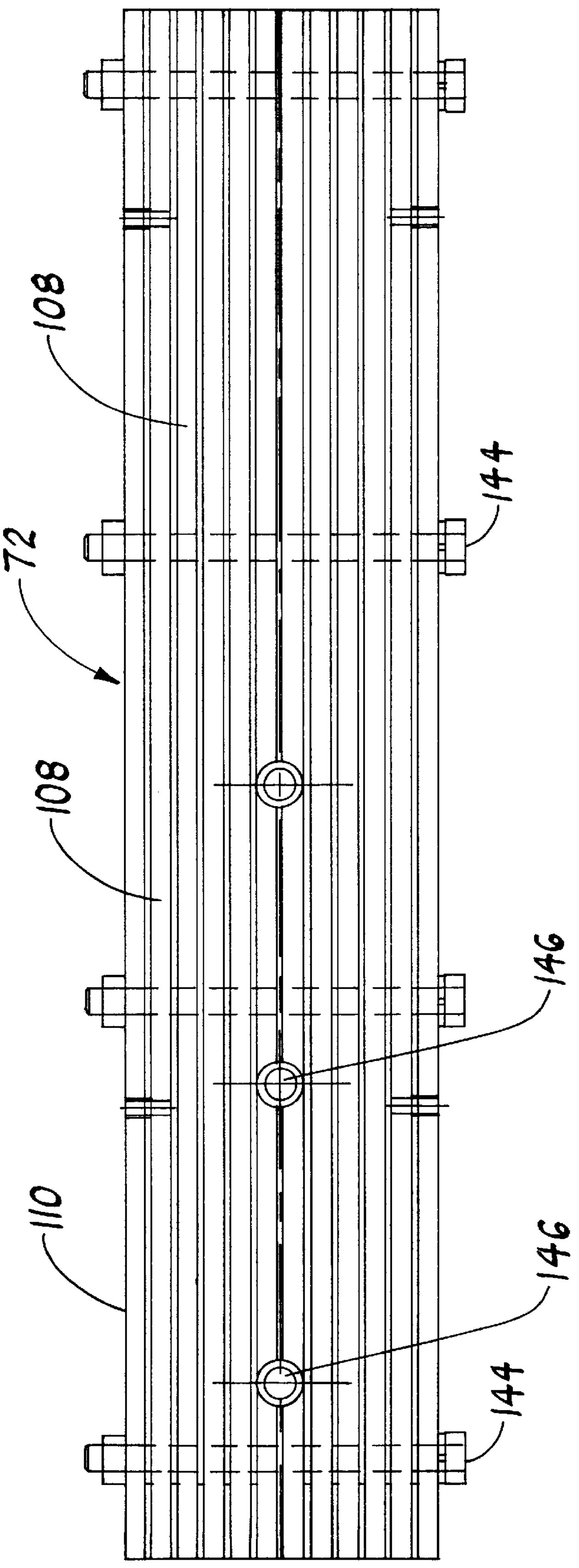
FIG. 7 is a top view of a coil support of the coil advance drive shown in FIG. 3.
Figure 8:
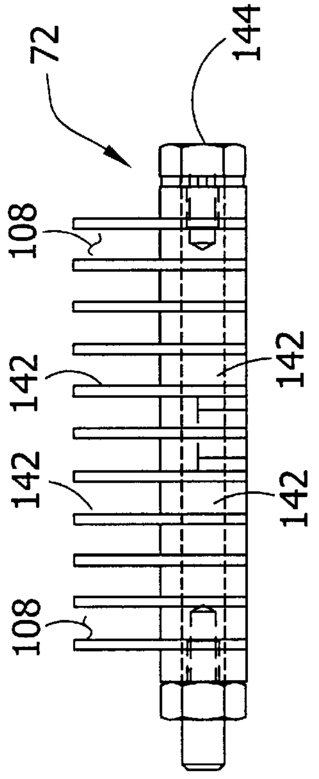
FIG. 8 is a front view of the coil support shown in FIG. 7.

FIG. 7 is a top view of coil support member 72 and FIG. 8 is a front view of coil support 72. Referring to FIGS. 7 and 8, coil support 72 includes a plurality of grooves 108 extending longitudinally in first surface 110 of support member 72. Grooves 108 are configured to receive pre-punched teeth 52 extending from the connector plate coil stock 30. Coil support 72 is fabricated from a plurality of pieces of metal 142 coupled together by a plurality of fasteners 144 and configured so as to form a plurality of grooves 108. Metal pieces 142 may also be welded together, or a combination of welding and fasteners 144 may be used to couple metal pieces 142 together. In alternative embodiments, grooves 108 are be machined into coil support 72. Coil support 72 also includes a plurality of mounting openings 146 to permit coil support member 72 to be coupled to support structure 14. Coil support member 72 is identical to coil support member 74, and therefore the above description of coil support member 72 also applies to coil support member 74.

In operation, coil advance drive apparatus 12 automatically advances coil stock 30 from two coils 48 to combination shear/presses 18 and 20 that will cut connector plates from coil stock 30 and then press the connector plates into opposing sides of wooden members 126 and 128 of a frame to join members 126 and 128 together. Coils 48 of connector plate stock 30 are mounted on coil mounting arms 32 and 34 of drive apparatus 12. Specifically, coils 48 are mounted on coil mounting hubs 40 and 42 of mounting arms 32 and 34 respectively. Coil stock 30 is then fed through drive apparatus 12 so that coil stock 30 slides through coil support members 72 and 74 with nail-like teeth 52 of coil stock 30 located in grooves 108 of support members 72 and 74. Drive wheels 76 and 78 engage coil stock 30 with teeth 102 extending from drive wheel 76 and 78 engaging open slots 50 of coil stock 30. As drive wheels 76 and 78 rotate, coil stock 30 is advanced by the action of rotating teeth 102 engaging coil stock 30 in slots 50. Coil stock 30 is advanced through channels 118 and 120 formed by support members 72 and 74 and coil support covers 114 and 116 respectively.

Proximity switch 122 counts the revolutions of drive wheel 76 so that drive wheel 76 can be stopped when the desired length of connector plate coil stock 30 is advanced into shear/press 18 to be cut. After shear/press 18 has cut a connector plate from coil 48, drive motor 70 can be re-energized to advance another length of connector plate coil stock 20 into shear/press 18 for cutting.

The above described coil advance drive apparatus 12 smoothly advances connector plate coil stock 30 into shear/presses 18 and 20. Drive apparatus 12 uses drive wheels 76 and 78 to advance coil stock 30. This drive mechanism is reliable and does not have the inherent problems of hydraulic or air cylinders, such as sticking in one position or slow movement of the cylinder rod due to dirt buildup.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A coil advance drive apparatus for at least one connector plate coil, the coil comprising an elongate strip of sheet metal connector plate stock having a plurality of spaced, open slots formed by pre-punched, integrally formed elongate nail-like teeth extending from a first surface of the connector plate stock, said coil advance drive apparatus comprising:

- a motor coupled to a support structure;
- at least one elongate coil support member, the coil support member comprising a plurality of grooves extending longitudinally in a first surface of the support member, said grooves being configured to receive the pre-punched teeth extending from the first surface of the connector plate stock of the coil; and
- at least one drive wheel operatively coupled to said motor, said drive wheel comprising a plurality of teeth extending from a circumferential surface of said drive wheel, said teeth being configured to engage the open slots in the connector plate coil stock so as to move the coil stock along said support member as said drive wheel rotates.

2. A coil advance drive apparatus in accordance with claim 1 further comprising at least one coil mounting arm, said mounting arm configured to receive a coil of connector plate stock.

3. A coil advance drive apparatus in accordance with claim 1 wherein each of said teeth is notationally offset from an axially adjacent one of said teeth for engaging open slots in the connector plate stock having a staggered arrangement.

4. A coil advance drive apparatus for at least one connector plate coil, the coil comprising an elongate strip of sheet metal connector plate stock having a plurality of spaced, open slots formed by pre-punched, integrally formed elongate nail-like teeth extending from a first surface of the connector plate stock, said coil advance drive apparatus comprising:

- a motor coupled to a support structure;
- at least one elongate coil support member;
- at least one drive wheel operatively coupled to said motor, said drive wheel comprising a plurality of teeth extending from a circumferential surface of said drive wheel, said teeth being configured to engage the open slots in the connector plate coil stock so as to move the coil stock along said support member as said drive wheel rotates; and
- a coil guide assembly comprising an upper guide roller, a lower guide roller, an upper guide member, and a lower guide member, each said guide roller having a plurality of circumferential grooves.

5. A coil advance drive apparatus in accordance with claim 1 wherein said drive wheel teeth are tapered.

6. A coil advance drive apparatus in accordance with claim 1 further comprising an elongate coil guide cover configured to at least partially cover said first surface of said coil support member to form a channel, said channel being configured to permit the connector plate stock to move along said first surface of said support member.

7. A coil advance drive apparatus in accordance with claim 6 wherein said coil guide cover comprises steel, aluminum or plastic.

8. A coil advance drive apparatus in accordance with claim 1 further comprising a proximity switch capable of measuring the revolutions of said drive wheel.

9. A coil advance drive apparatus in accordance with claim 1 wherein each said drive wheel comprises a plurality of drive sprockets and a plurality of spacers, each said drive sprocket being separated from an adjacent drive sprocket by at least one said spacer, said plurality of said drive sprockets and said spacers being coupled together to form a single drive wheel, each said drive sprocket comprising a plurality of teeth extending from a circumferential surface, said teeth being configured to engage the open slots in the connector plate coil stock so as to move the coil stock along said support member as said drive wheel rotates.

10. A coil advance drive apparatus in accordance with claim 9 wherein said apparatus comprises two coil support members and two drive wheels.

11. A coil advance drive apparatus in accordance with claim 1 further comprising a coil guide assembly, said guide assembly comprising an upper guide roller, a lower guide roller, an upper guide member, and a lower guide member, each said guide roller comprising a plurality of circumferential grooves.

12. A coil advance drive apparatus in accordance with claim 11 wherein said guide assembly further comprises a plurality of side alignment rollers pivotally coupled to a support bracket.

13. Apparatus for cutting at least one connector plate coil having integral teeth into discrete connector plates and embedding the teeth of the connector plates into wooden frame members, the connector plate coil comprising an elongate strip of sheet metal connector plate stock having a plurality of spaced, open slots formed by pre-punched, integrally formed elongate nail-like teeth extending from a first surface of the connector plate stock, said apparatus comprising:

- a support structure;
- at least one combination press head and shear;
- at least one cutting edge; and
- a coil advance drive assembly, said coil advance drive assembly comprising:
  - a motor;
  - at least one elongate coil support member, the coil support member comprising a plurality of grooves extending longitudinally in a first surface of the support member, said grooves being configured to receive the pre-punched teeth extending from the first surface of the connector plate stock of the coil; and
  - at least one drive wheel operatively coupled to said motor, said drive wheel comprising a plurality of teeth extending from a circumferential surface of said drive wheel, said teeth being configured to engage the open slots in the connector plate coil stock so as to move the coil stock along said support member as said drive wheel rotates.

14. Apparatus in accordance with claim 13 wherein said coil advance drive assembly further comprise at least one coil mounting arm, said mounting arm being configured to receive a coil of connector plate stock.

15. Apparatus in accordance with claim 13 wherein each of said teeth is rotationally onet from an axially adjacent one of said teeth for engaging open slots in the connector plate stock having a staggered arrangement.

16. A coil advance drive apparatus in accordance with claim 4 wherein said guide assembly further comprises a plurality of side alignment rollers pivotally attached to a support bracket.

17. Apparatus in accordance with claim 13 wherein said coil advance drive assembly further comprises an elongate coil guide cover first, said coil guide cover configured to at least partially cover said first surface of said coil support member to form a channel being, said channel configured to permit the connector plate stock to move along said first surface of said support member.

18. Apparatus in accordance with claim 17 wherein said coil guide cover comprises steel, aluminum or plastic.

19. Apparatus in accordance with claim 13 wherein said coil advance drive assembly further comprises a proximity switch capable of measuring the revolutions of said drive wheel.

20. Apparatus in accordance with claim 18 wherein each drive wheel comprises a plurality of drive sprockets and a plurality of spacers, each said drive sprocket being separated from an adjacent drive sprocket by at least one said spacer, said plurality of said drive sprockets and said spacers being coupled together to form single drive wheel, each said drive sprocket comprising a plurality of teeth extending from a circumferential surface, said teeth being configured to engage the open slots in the connector plate coil stock so as to move the coil stock along said support member as said drive wheel rotates.

21. Apparatus in accordance with claim 20 wherein said coil advance drive assembly comprises two coil support members, and two drive wheels.

22. Apparatus in accordance with claim 13 wherein said coil advance drive assembly further comprises a coil guide assembly, said guide assembly comprising an upper guide roller, a lower guide roller, an upper guide member, and a lower guide member, each said guide roller comprising a plurality of circumferential grooves.

23. Apparatus in accordance with claim 22 wherein said guide assembly further comprises a plurality of side alignment rollers pivotally coupled to a support bracket.

24. Apparatus for cutting at least one connector plate coil having integral teeth into discrete connector plates and embedding the teeth of the connector plates into wooden frame members, the connector plate coil comprising an elongate strip of sheet metal connector plate stock having a plurality of spaced, open slots formed by pre-punched, integrally formed elongate nail-like teeth extending from a first surface of the connector plate stock, said apparatus comprising:

- a support structure;
- at least one combination press head and shear;
- at least one cutting edge; and
- a coil advance drive assembly, said coil advance drive assembly comprising:
  - a motor coupled to said support structure;
  - at least one elongate coil support member,
  - at least one drive wheel operatively coupled to said motor, said drive wheel comprising a plurality of teeth extending from a circumferential surface of said drive wheel, said teeth being configured to engage the open slots in the connector plate coil stock so as to move the coil stock along said support member as said drive wheel rotates; and
  - a coil guide assembly comprising an upper guide roller, a lower guide roller, an upper guide member, and a lower guide member, each said guide roller having a plurality of circumferential grooves.

25. Apparatus in accordance with claim 24 wherein said guide assembly further comprises a plurality of side alignment rollers pivotally attached to a support bracket.

26. A coil advance drive apparatus for at least one connector plate coil, the coil comprising an elongate strip of sheet metal connector plate stock having a plurality of spaced, open slots formed by pre-punched, integrally formed elongate nail-like teeth extending from a first surface of the connector plate stock, said coil advance drive apparatus comprising:

a motor;

at least one elongate coil support member;

at least one drive wheel operatively coupled to said motor, said drive wheel comprising a plurality of axially adjacent rows of teeth extending from a circumferential surface of said drive wheel, each of said teeth being configured to engage the open slots in the connector plate coil stock so as to move the coil stock along said support member as said drive wheel rotates; and each of said teeth of the drive wheel being rotationally offset from an axially adjacent one of said teeth for engaging open slots in the connector plate stock having a staggered arrangement.

* * * * *

UNITED STATES PATENT AND TRADEMARK OFFICE

CERTIFICATE OF CORRECTION

PATENT NO. : 6,256,862 B1
DATED : July 10, 2001
INVENTOR(S) : Michael Marc Olden et al.

It is certified that error appears in the above-identified patent and that said Letters Patent is hereby corrected as shown below:

Column 6, claim 3,
Line 37, "notationally" should read -- rotationally --.

Column 7, claim 14,
Line 61, "comprise" should read -- comprises --.

Column 7, claim 15,
Line 65, "onet" should read -- offset --.

Column 8, claim 20,
Line 23, "form single" should read -- form a single --.

Signed and Sealed this

Twelfth Day of March, 2002

*Attest:*

JAMES E. ROGAN

*Attesting Officer*

*Director of the United States Patent and Trademark Office*